United States Patent
Kim et al.

(10) Patent No.: US 9,171,691 B2
(45) Date of Patent: Oct. 27, 2015

(54) FILM TARGET FOR LASER-INDUCED PARTICLE ACCELERATION AND METHOD OF MANUFACTURING THE SAME

(71) Applicant: Korea Atomic Energy Research Institute, Daejeon (KR)

(72) Inventors: Kyung Nam Kim, Uijeongbu-si (KR); Kitae Lee, Daejeon (KR); Seong Hee Park, Daejeon (KR); Young Uk Jeong, Daejeon (KR); Kyu-Ha Jang, Daejeon (KR); Ha-Na Kim, Incheon (KR); Byung Heon Han, Daejeon (KR)

(73) Assignee: Korea Atomic Energy Research Institute, Daejeon (KR)

( * ) Notice: Subject to any disclaimer, the term of this patent is extended or adjusted under 35 U.S.C. 154(b) by 0 days.

(21) Appl. No.: 14/471,513

(22) Filed: Aug. 28, 2014

(65) Prior Publication Data
US 2015/0187532 A1    Jul. 2, 2015

(30) Foreign Application Priority Data

Dec. 31, 2013  (KR) .................. 10-2013-0168182
May 27, 2014  (KR) .................. 10-2014-0063997

(51) Int. Cl.
*H01J 27/24*   (2006.01)
*H01J 27/02*   (2006.01)
*B32B 15/08*   (2006.01)

(52) U.S. Cl.
CPC .............. *H01J 27/022* (2013.01); *B32B 15/08* (2013.01); *H01J 27/24* (2013.01); *B32B 2250/03* (2013.01); *B32B 2250/40* (2013.01); *B32B 2307/20* (2013.01)

(58) Field of Classification Search
USPC .......................... 250/423 R, 424, 425, 423 P
See application file for complete search history.

(56) References Cited

U.S. PATENT DOCUMENTS

2010/0320394 A1*  12/2010  Ma et al. ................. 250/398

FOREIGN PATENT DOCUMENTS

KR     10-1269098 B1    5/2013
KR     10-1331493 B1    11/2013

OTHER PUBLICATIONS

Office Action dated Jun. 15, 2015 of corresponding Korean Patent Application No. 10-2014-0063997—4 pages.

* cited by examiner

*Primary Examiner* — Nicole Ippolito
*Assistant Examiner* — Hanway Chang
(74) *Attorney, Agent, or Firm* — Knobbe Martens Olson & Bear, LLP

(57) ABSTRACT

A film target for laser-induced particle acceleration includes a first target layer on which a laser is incident; an intermediate layer located behind the first target layer along a propagating direction of the laser, and in which an intended ion beam is generated; and a second target layer located opposite to the first target layer with the intermediate layer interposed therebetween.

16 Claims, 7 Drawing Sheets

FILM TARGET FOR LASER-INDUCED PARTICLE ACCELERATION AND METHOD OF MANUFACTURING THE SAME

CROSS-REFERENCE TO RELATED APPLICATION

This application claims priority to and the benefit of Korean Patent Application Nos. 10-2013-0168182 filed on Dec. 31, 2013 and 10-2014-0063997, filed on May 27, 2014, the disclosures of which are incorporated herein by reference in their entirety.

BACKGROUND

1. Field

The present disclosure relates to a film target for laser-induced particle acceleration and a method of manufacturing the same, and more particularly, to a film target in which an ion layer is inserted and a method of manufacturing the same.

2. Discussion of Related Art

Conventionally, research and development of laser-induced particle acceleration using an ultra-short intense laser have been actively conducted.

When the ultra-short intense laser is focused on a thin layer, high energy ion beams are generated. The biggest issue is improving the energy characteristic of the ion beam, that is, to increase energy and reduce the energy width in the laser accelerated ion beam generation techniques.

Currently, the most remarkable technique is to use a very thin film of tens of nanometers thickness. However, the technique for substantially reducing a preceding pulse of the laser is additionally required, and the energy characteristic of the ion beam resulting from a very thin film are also not continuously improved when the intensity of the laser is increased due to non-uniform transverse spatial distribution of the laser intensity.

SUMMARY

One aspect of the present invention is directed to a film target for laser-induced particle acceleration in which energy characteristic of an ion bean is improved, and a method of manufacturing the same.

Another aspect of the present invention is directed to a film target for laser-induced particle acceleration in which manufacturing thereof is easy and handling thereof is convenient, and a method of manufacturing the same.

A further aspect of the present invention is directed to a film target for laser-induced particle acceleration in which the energy characteristic of an accelerated ion beam may be adjusted, and a method of manufacturing the same.

One aspect of the present invention provides a film target 100 for laser-induced particle acceleration, including: a first target layer 300 on which a laser 200 is incident; an intermediate layer 400 located behind the first target layer 300 along a propagating direction of the laser 200, and in which an intended ion beam 600 is generated; and a second target layer 500 located opposite to the first target layer 300 with the intermediate layer 400 interposed therebetween.

Another aspect of the present invention provides a method of manufacturing a film target for laser-induced particle acceleration, including: preparing a first target layer 300 on which a laser is incident; forming an intermediate layer 400 behind the first target layer 300 along a propagating direction of the laser to generate an intended ion beam; and forming a second target layer 500 opposite to the first target layer 300 with the intermediate layer 400 interposed therebetween.

Another aspect of the invention provides a film target for laser-induced ion beam acceleration, the film target comprising: a first metallic layer comprising a laser-incident surface to which a laser is to be incident; a second metallic layer; and an intermediate layer interposed between the first and second metallic layers, the intermediate layer being of a non-metallic material comprising one or more source elements for ion beams.

In the foregoing film target, the first metallic layer may have a thickness measured in a direction perpendicular to the laser-incident surface and greater than that of the second metallic layer. The intermediate layer may contact the first metallic layer on one side, the intermediate layer contacting the second metallic layer on the other side. The non-metallic material may comprise a plastic material. The non-metallic material may comprise either or both of hydrogen (H) and carbon (C).

Still another aspect of the invention provides a laser-induced particle acceleration device comprising: a laser source configured to generate a laser beam; and the foregoing film target arranged such that the laser beam is to be incident to the laser-incident surface of the first metallic layer.

A further aspect of the invention provides a method of manufacturing a film target for laser-induced ion beam acceleration, the method comprising: providing a first metallic layer; forming an intermediate layer of a non-metallic material over the first metallic layer, the non-metallic material comprising one or more source elements for ion beams; and forming a second metallic layer over the intermediate layer such that the intermediate layer is interposed between the first and second metallic layers, thereby making the foregoing film target.

In the foregoing method, the first metallic layer may have a thickness measured in a direction perpendicular to the laser-incident surface and greater than that of the second metallic layer. The intermediate layer may contact the first metallic layer on one side, the intermediate layer contacting the second metallic layer on the other side. The non-metallic material may comprise a plastic material. The non-metallic material may comprise either or both of hydrogen (H) and carbon (C).

A further aspect of the invention provides a method of manufacturing the foregoing film target, the method comprising: providing a metallic layer for the second metallic layer of the film target; forming an intermediate layer of a non-metallic material over the metallic layer, the non-metallic material comprising one or more source elements for ion beams; and forming another metallic layer for the first target layer of the film target over the intermediate layer such that the intermediate layer is interposed between the two metallic layers, thereby making the foregoing film target.

In the foregoing method, the first metallic layer may have a thickness measured in a direction perpendicular to the laser-incident surface and greater than that of the second metallic layer. The intermediate layer may contact the first metallic layer on one side, the intermediate layer contacting the second metallic layer on the other side. The non-metallic material may comprise a plastic material. The non-metallic material may comprise either or both of hydrogen (H) and carbon (C).

BRIEF DESCRIPTION OF THE DRAWINGS

The above and other features and advantages of the present invention will become more apparent to those of ordinary skill in the art by describing in detail example embodiments thereof with reference to the accompanying drawings, in which.

DETAILED DESCRIPTION OF EMBODIMENTS

Hereinafter, example embodiments of the present invention will be described in detail below with reference to the accompanying drawings.

Figure 1:
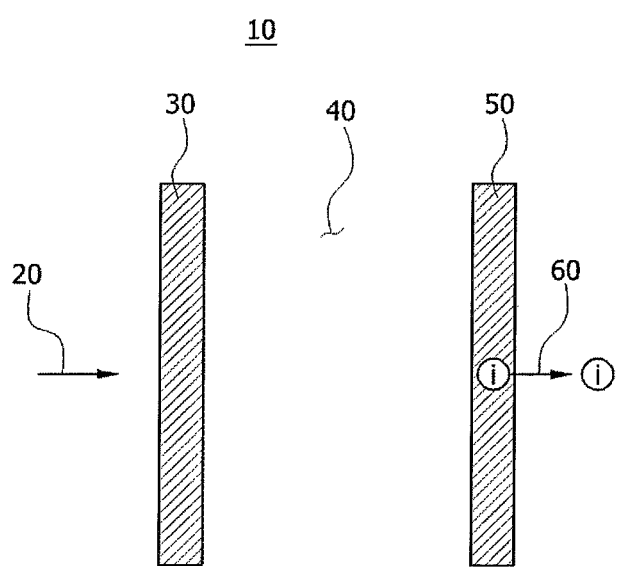
FIG. 1 is a view showing a double-layer target including a vacuum layer for laser-induced particle acceleration according to a conventional technique.

In one example, a double-layer target includes a vacuum layer for laser-induced particle generation, as described in FIG. 1. A double-layer target 10 includes a first target layer 30 configured to react with a preceding pulse of a laser 20 and generate plasma. The double-layer target 10 further includes a second target layer 50 configured to generate an ion beam 60 by a main pulse of the laser 20, and a vacuum layer 40 formed between the first target layer 30 and the second target layer 50 to prevent a shock wave by the plasma from being transferred to the second target layer 50.

The double-layer target has an advantage in that the ion beam, of which the energy is high and at the same time the energy width is small, may be generated, even though a high quality laser, in which a preceding pulse required in the existing target is small, is not required.

Film Target for Laser-Induced Particle Acceleration

Figure 2:
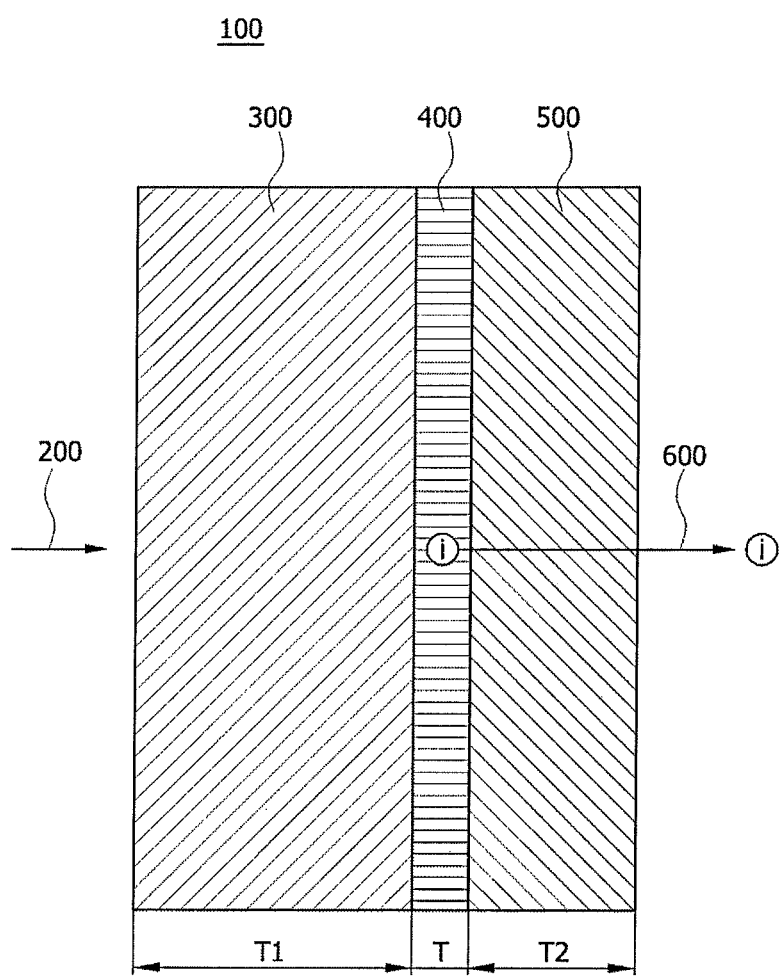
FIG. 2 is a view showing a film target for laser-induced particle acceleration according to an embodiment of the present invention.

FIG. 2 is a view showing a film target for laser-induced particle acceleration according to an embodiment of the present invention.

As shown in FIG. 2, a film target 100 for laser-induced particle acceleration according to the embodiment of the present invention includes a first target layer 300 configured to react with a laser 200 and adjust energy characteristic of an accelerated ion beam 600, a second target layer 500, and an intermediate layer 400 located between the first target layer 300 and the second target layer 500, and comprising an intended ion species.

The laser 200 radiates from left to right in FIG. 2, and is focused on a surface of the first target layer 300.

The first target layer 300 and the second target layer 500 may include metal materials of several micrometers thickness, for example, Al, Cu, Ti, Ta, etc. Specifically, it advantageously serves to increase the energy of the ion beam 600 when a material having a higher atomic number is used for the first target layer 300 and the second target layer 500.

The first target layer 300 and the second target layer 500 may be configured to have different thicknesses T1 and T2. Specifically, the thickness T1 of the first target layer 300 may be greater than the thickness T2 of the second target layer 500 in order that the ion beam 600 is smoothly accelerated to the right in FIG. 2.

The intermediate layer 400 may be a very thin layer of which a thickness T is tens of nanometers, and may be configured of an intended accelerated particle, for example, a material including H, C, etc. Specifically, the intermediate layer 400 may be configured of a plastic-based material.

As described above, the film target 100 for laser-induced particle acceleration according to the embodiment of the present invention is insensitive to the influence by the preceding pulse, since the thickness T1 of the first target layer is several micrometers or more, and at the same time the intended ion beam 600 is formed on a center of the entire film target 100. Therefore, the additional technique for reducing the preceding pulse of the laser 200 is not required compared to the conventional technique.

Therefore, the film target for laser-induced particle acceleration according to the embodiment of the present invention may innovatively improve the energy characteristic of the ion beam among laser accelerated ion beam generation techniques. That is, the film target may adjust the energy characteristic of the ion beam and be insensitive to the preceding pulse of the laser as described above, and may be easy to manufacture, as described below. As these effects are difficult to implement by the conventional technique, utilization of the laser accelerated ion beam may be considerably increased in many areas of basic science, nuclear physics, health care, and the like, such as high-speed plasma diagnostics, nuclear reactions, cancer treatment, etc.

Figure 3:
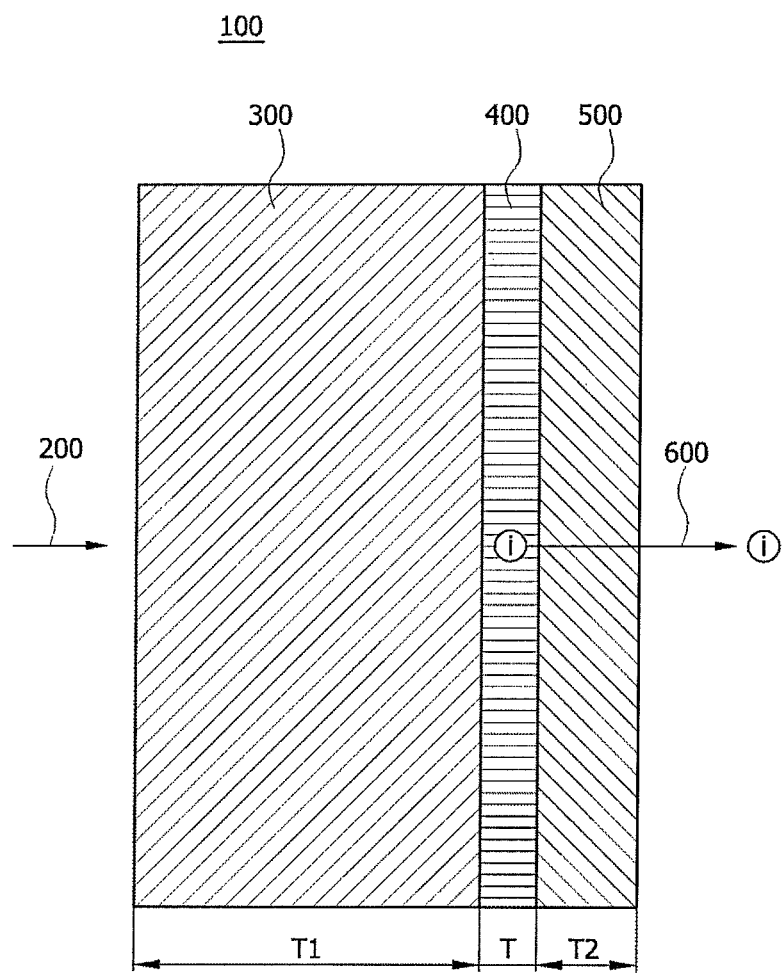
FIG. 3 is a view showing a film target for laser-induced particle acceleration according to another embodiment of the present invention.
Figure 4A:
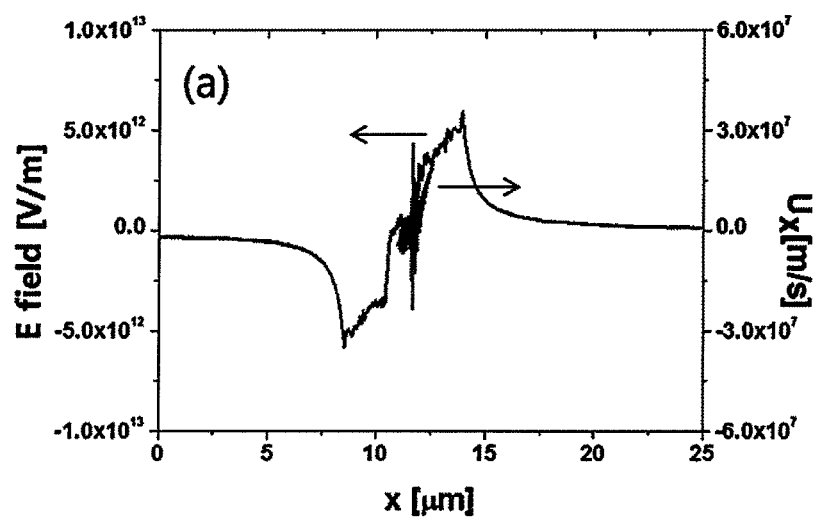
FIGS. 4A and 4B are graphs showing a gradient in a spatial distribution of an electric field inside the film target and a phase distribution of an ion beam according to changes in a thickness T1 of a first target layer and a thickness T2 of a second target layer.
Figure 4B:
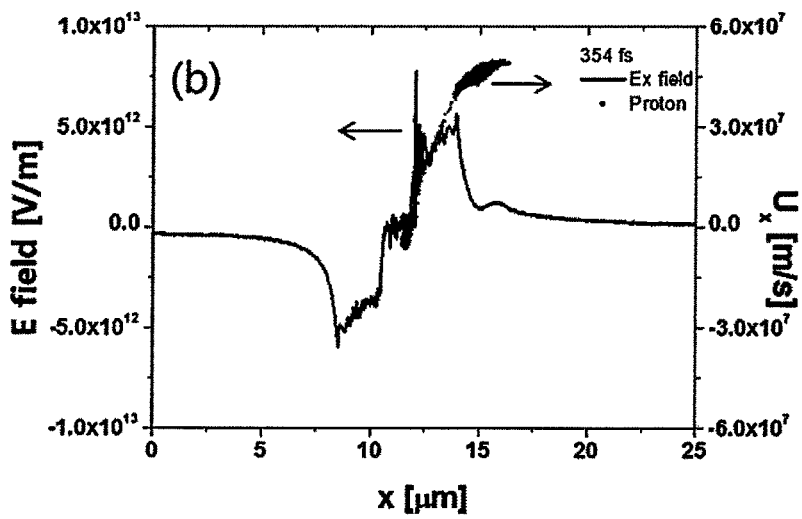
Figure 5:
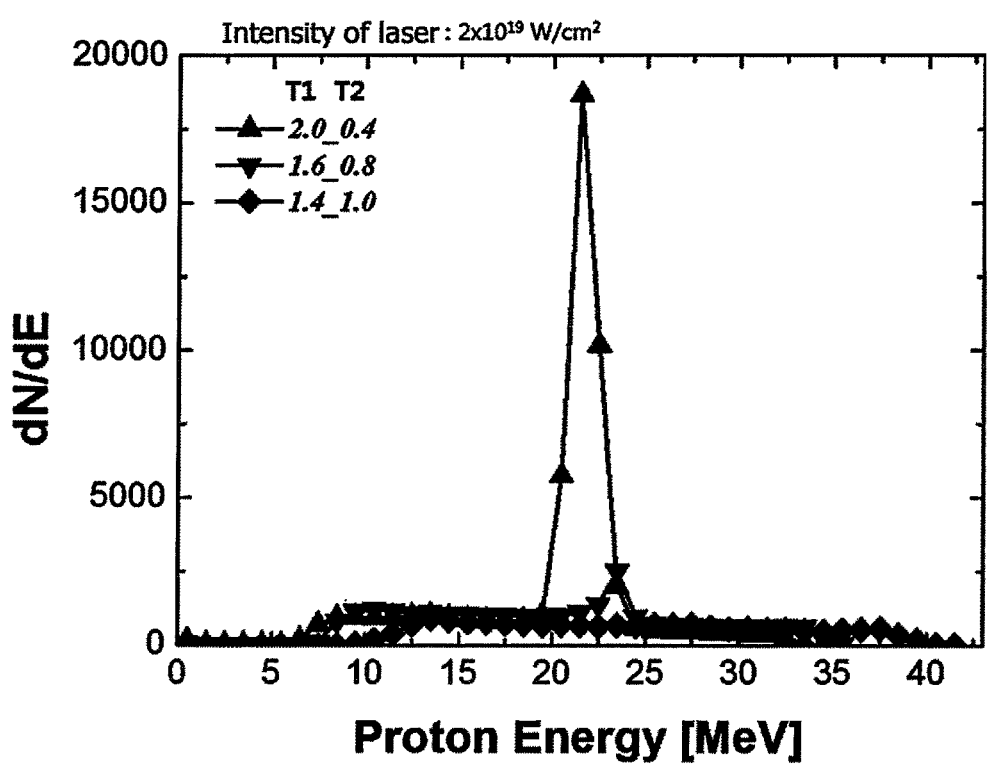
FIG. 5 is a graph showing an energy distribution of the ion beam according to the changes in the thickness T1 of the first target layer and the thickness T2 of the second target layer.
Figure 6:
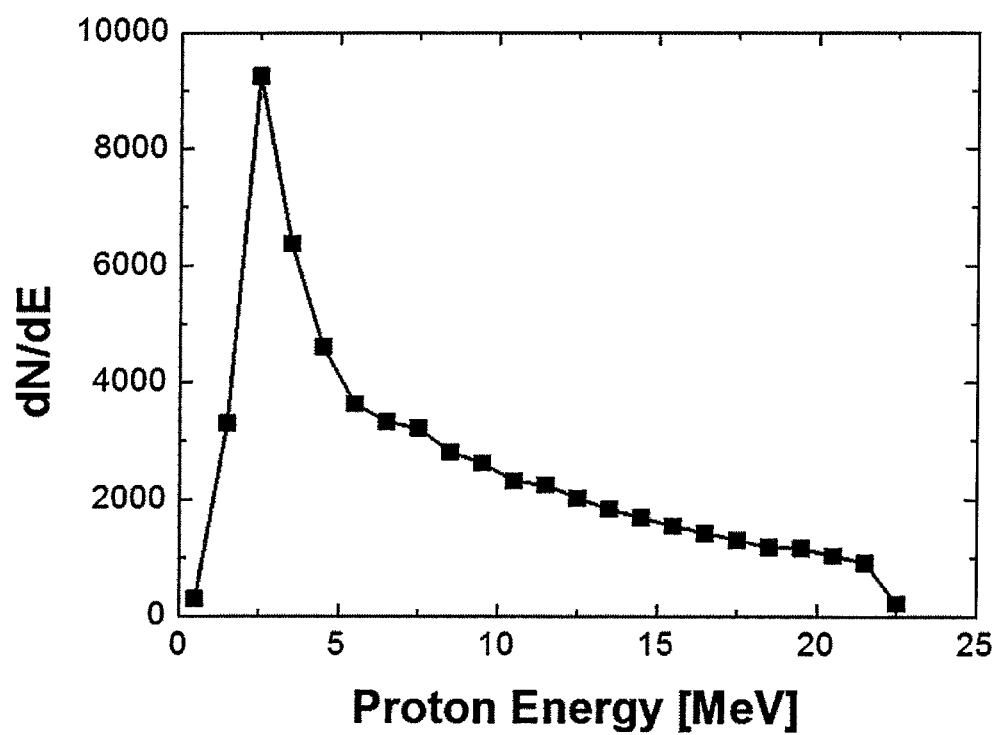
FIG. 6 is a graph showing an energy distribution of a proton beam when a single thin film is used.

FIG. 3 is a view showing a film target for laser-induced particle acceleration according to another embodiment of the present invention. FIGS. 4A and 4B are graphs showing a gradient in a spatial distribution of an electric field inside the film target and a phase distribution of an ion beam according to changes of a thickness T1 of a first target layer and a thickness T2 of a second target layer, which are generated by focusing an ultra-intense laser pulse. Specifically, FIG. 4A is a graph showing a film target configured of copper (Cu) in which the thickness T1 of the first target layer is 1.6 μm, and the thickness T2 of the second target layer is 0.8 μm, and FIG. 4B is a graph showing a film target configured of copper (Cu) in which the thickness T1 of the first target layer is 2.0 μm, and the thickness T2 of the second target layer is 0.4 μm. FIG. 5 is a graph showing an energy distribution of the ion beam according to the changes in the thickness T1 of the first target layer and the thickness T2 of the second target layer. Further, FIG. 6 is a graph showing an energy distribution of a proton beam when a single thin film is used.

A film target for laser-induced particle acceleration according to another embodiment of the present invention is similar to the film target for laser-induced particle acceleration according to an embodiment of the present invention described above except for the thickness T1 of the first target layer and the thickness T2 of a second target layer. Thus, like reference numerals in the drawings denote like elements, and thus the description thereof will not be repeated.

As shown in FIG. 3, the film target for laser-induced particle acceleration according to another embodiment of the present invention includes a first target layer 300, a second target layer 500, and an intermediate layer 400.

In embodiments of the present invention, energy characteristic of an accelerated ion beam 600 may be adjusted by controlling a ratio of a thickness T1 of the first target layer to a thickness T2 of the second target layer.

Referring to FIG. 4A and FIG. 5, in the case where the intermediate layer 400, in which an intended ion beam 600 is generated, is closely located to a center of the first target layer 300 and the second target layer 500 (T1=1.6 μm, and T2=0.8 μm), when the ion beam 600 is accelerated by an electric field E formed inside a plasma by a laser, since a gradient in the spatial distribution of the electric field E is larger and an acceleration length is longer, an energy width of the ion beam 600 is greater, however, a maximum energy thereof is increased. As shown in FIG. 4A, the gradient in the spatial distribution of the electric field E is larger in a center area of an X-axis, however, the gradient therein is reduced toward the right. Therefore, since an initial location of the ion beam 600 is concentrated in the middle of the X-axis, and the ion beam 600 is accelerated by an entire electric field E having a positive (+) value, the acceleration length is longer.

Referring to FIG. 4B and FIG. 5, and to the contrary of FIG. 4A, since the gradient in the spatial distribution of the electric field E is smaller when the intermediate layer 400 is located close to a surface of the second target layer 500 (T1=2.0 μm, and T2=0.4 μm), the maximum energy of the ion beam 600 is smaller, however, the energy width thereof is reduced. As shown in FIG. 4B, the gradient in the spatial distribution of the electric field E is similar to that of in FIG. 4A. However, FIG. 4B shows that the initial location of the ion beam 600 is more biased to the right on the X-axis. Therefore, since the ion beam 600 is accelerated by a right part of the entire electric field E having a positive (+) value, the acceleration length is reduced.

Referring to FIGS. 5 and 6, when the intermediate layer 400 is located too close to the surface of the second target layer 500, rather, the energy characteristic of the generated ion beam 600 becomes the energy characteristic of the ion beam generated in the existing thin film.

Figure 7A:
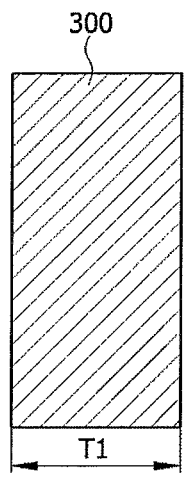
FIGS. 7A-7C are schematic cross-sectional views showing a method of manufacturing the film target for laser-induced particle acceleration according to the embodiment of the present invention.
Figure 7B:
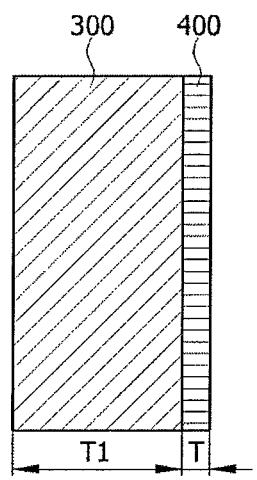
Figure 7C:
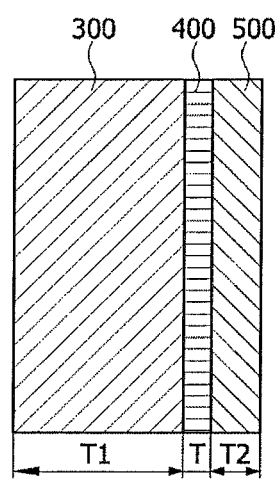

A Method of Manufacturing the Film Target for Laser-Induced Particle Acceleration FIGS. 7A, 7B, and 7C are schematic cross-sectional views of the process showing a method of manufacturing the film target for laser-induced particle acceleration according to the embodiment of the present invention, and show a process of manufacturing the film target for laser-induced particle acceleration shown in FIGS. 2 and 3.

As shown in FIG. 7A, a first target layer 300 having a predetermined thickness T1 is prepared using an easily obtainable metal film.

As shown in FIG. 7B, an intermediate layer 400 is formed by coating the first target layer 300 with a plastic-based material to have a thickness T of tens of nanometers.

As shown in FIG. 7C, a second target layer 500 is formed by coating the intermediate layer 400, which is formed on the first target layer 300, to have a thickness T2 of several micrometers, again, using a metal film.

According to embodiments of the present invention as described above, there are the following advantages.

According to embodiments of the present invention, as different materials are used for the first target layer and the second target layer, the energy characteristic of the accelerated ion beam can be improved.

According to embodiments of the present invention, as the first target layer and the second target layer have different thicknesses from each other, the energy characteristic of the accelerated ion beam can be adjusted.

According to embodiments of the present invention, as the intended ion beam is generated between the first target layer and the second target layer, it is insensitive to an influence by a preceding pulse of the laser, and it does not require an additional technique for reducing the preceding pulse of the laser.

According to embodiments of the present invention, as easily obtainable materials are used, manufacturing thereof is easy.

Further, according to embodiments of the present invention, as a target is formed in a film shape, handling thereof is convenient.

While the present invention has been particularly described with reference to example embodiments, it will be understood by those skilled in the art that various changes in form and details may be made without departing from the spirit and scope of the present invention. Therefore, the example embodiments should be considered in a descriptive sense only and not for purposes of limitation. The scope of the invention is defined not by the detailed description of the invention but by the appended claims, and encompasses all modifications and equivalents that fall within the scope of the appended claims.

What is claimed is:

1. A film target for laser-induced ion beam acceleration, the film target comprising:
    a first metallic layer comprising a laser-incident surface to which a laser is to be incident;
    a second metallic layer; and
    an intermediate layer interposed between the first and second metallic layers, the intermediate layer being of a non-metallic material comprising one or more source elements for ion beams.

2. The film target of claim 1, wherein the first metallic layer has a thickness measured in a direction perpendicular to the laser-incident surface and greater than that of the second metallic layer.

3. The film target of claim 1, wherein the intermediate layer contacts the first metallic layer on one side, the intermediate layer contacting the second metallic layer on the other side.

4. The film target of claim 1, wherein the non-metallic material comprises a plastic material.

5. The film target of claim 1, wherein the non-metallic material comprises either or both of hydrogen (H) and carbon (C).

6. A laser-induced particle acceleration device comprising:
    a laser source configured to generate a laser beam; and
    the film target of claim 1 arranged such that the laser beam is to be incident to the laser-incident surface of the first metallic layer.

7. A method of manufacturing a film target for laser-induced ion beam acceleration, the method comprising:
    providing a first metallic layer;
    forming an intermediate layer of a non-metallic material over the first metallic layer, the non-metallic material comprising one or more source elements for ion beams; and
    forming a second metallic layer over the intermediate layer such that the intermediate layer is interposed between the first and second metallic layers, thereby making the film target of claim 1.

8. The method of claim 7, wherein the first metallic layer has a thickness measured in a direction perpendicular to the laser-incident surface and greater than that of the second metallic layer.

9. The method of claim 7, wherein the intermediate layer contacts the first metallic layer on one side, the intermediate layer contacting the second metallic layer on the other side.

10. The method of claim 7, wherein the non-metallic material comprises a plastic material.

11. The method of claim 7, wherein the non-metallic material comprises either or both of hydrogen (H) and carbon (C).

12. A method of manufacturing the film target of claim 1, the method comprising:

provide a metallic layer for the second metallic layer of the film target;

forming an intermediate layer of a non-metallic material over the metallic layer, the non-metallic material comprising one or more source elements for ion beams; and forming another metallic layer for the first target layer of the film target over the intermediate layer such that the intermediate layer is interposed between the two metallic layers, thereby making the film target of claim 1.

13. The method of claim 12, wherein the intermediate layer contacts the first metallic layer on one side, the intermediate layer contacting the second metallic layer on the other side.

14. The method of claim 12, wherein the non-metallic material comprises either or both of hydrogen (H) and carbon (C).

15. The method of claim 12, wherein the first metallic layer has a thickness measured in a direction perpendicular to the laser-incident surface and greater than that of the second metallic layer.

16. The method of claim 12, wherein the non-metallic material comprises a plastic material.

* * * * *